(12) United States Patent
Nguyen

(10) Patent No.: US 6,502,192 B1
(45) Date of Patent: Dec. 31, 2002

(54) SECURITY BETWEEN CLIENT AND SERVER IN A COMPUTER NETWORK

(75) Inventor: Dan Linh Nguyen, Westminster, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/146,727

(22) Filed: Sep. 3, 1998

(51) Int. Cl.[7] .............................................. G06F 13/14
(52) U.S. Cl. ........................ 713/201; 713/200; 713/202; 380/21
(58) Field of Search ................................ 713/201, 200; 380/21

(56) References Cited

U.S. PATENT DOCUMENTS

| 4,922,486 A | 5/1990 | Lidinsky et al. ............... 370/60 |
| 4,962,532 A | 10/1990 | Kasiraj et al. ................. 380/25 |
| 5,003,595 A | 3/1991 | Collins et al. ................. 380/25 |
| 5,163,147 A | 11/1992 | Orita ........................... 395/600 |
| 5,241,594 A | 8/1993 | Kung ............................. 380/4 |
| 5,241,599 A | 8/1993 | Bellovin et al. ............... 380/21 |
| 5,319,644 A | 6/1994 | Liang ......................... 370/85.5 |
| 5,351,136 A | 9/1994 | Wu et al. ..................... 358/440 |
| 5,416,842 A | 5/1995 | Aziz ............................. 380/30 |
| 5,421,006 A | 5/1995 | Jablon et al. ................. 395/575 |
| 5,440,635 A | 8/1995 | Bellovin et al. ............... 380/25 |
| 5,570,361 A | 10/1996 | Norizuki et al. ............. 370/60.1 |
| 5,586,260 A * | 12/1996 | Hu ............................... 713/201 |
| 5,621,721 A | 4/1997 | Vatuone ........................ 370/16 |
| 5,655,077 A | 8/1997 | Jones et al. ............. 395/187.01 |
| 5,659,542 A | 8/1997 | Bell et al. .................... 370/496 |
| 5,671,354 A | 9/1997 | Ito et al. ....................... 395/187 |
| 5,680,461 A | 10/1997 | McManis ..................... 380/25 |
| 5,684,950 A | 11/1997 | Dare et al. ............. 395/187.01 |
| 5,691,997 A | 11/1997 | Lackey, Jr. ................... 371/53 |
| 5,708,780 A | 1/1998 | Levergood et al. .... 395/200.12 |
| 5,764,235 A * | 6/1998 | Hunt et al. ................... 345/428 |
| 5,764,772 A | 6/1998 | Kaufman et al. ............. 380/30 |
| 5,793,763 A | 8/1998 | Mayes et al. ................ 370/389 |
| 5,815,665 A | 9/1998 | Teper et al. ................. 395/200 |
| 5,835,036 A | 11/1998 | Takefman ..................... 341/95 |
| 5,835,727 A | 11/1998 | Wong et al. ........... 395/200.68 |

(List continued on next page.)

FOREIGN PATENT DOCUMENTS

| WO | WO 99/53408 | 10/1999 | ........... G06F/15/16 |

OTHER PUBLICATIONS

Bellare et al., "Keying Hash Functions for Message Authentication", 1996, Advances in Cryptology–Crypto 96 Proceedings, Lecture Notes in Computer Science, vol. 1109, N. Koblitz ed., Springer–Verlag.

Bellovin, Steven M., "Problem Areas for the IP Security Protocols", Jul. 22–25, 1996, Proceedings of the Sixth Usenix UNIX Security Symposium, San Jose, CA.

Krawczyk, Hugo, "SKEME: A Versatile Secure Key Exchange Mechanism for Internet", 1996, IEEE, Proceedings of the 1996 Symposium on Network and Distributed Systems Security.

*Primary Examiner*—Ly V. Hua
(74) *Attorney, Agent, or Firm*—Thelen Reid & Priest; Marc S. Hanish (57) ABSTRACT

Improved security between a client and a server in a computer network is provided by allowing either endpoint (the client or the server) to initiate request messages. In this way, it is possible to configure the system so that the server always makes the opening move of negotiation, allowing the location of the server to remain hidden until a legal session is established. Dynamic relocation of the server further hides the location of the server from unauthorized users. Additionally, each message may be authenticated individually as it is received, with the endpoint making no response to an unauthentic message, thus preventing attacks on its security. Finally, negotiation of both the encryption method and the key used in the encryption process allows for the rapid reconfiguration of encryption to protect against unauthorized users who may have broken the code.

110 Claims, 4 Drawing Sheets

U.S. PATENT DOCUMENTS

| | | | |
|---|---|---|---|
| 5,845,070 A | 12/1998 | Ikudome | 395/187.01 |
| 5,898,780 A | 4/1999 | Liu et al. | 380/25 |
| 5,930,804 A * | 7/1999 | Yu et al. | 707/104 |
| 5,944,824 A | 8/1999 | He | 713/201 |
| 5,987,232 A | 11/1999 | Tabuki | 395/187 |
| 5,991,810 A | 11/1999 | Shapiro et al. | 709/229 |
| 6,006,334 A | 12/1999 | Nguyen et al. | 713/202 |
| 6,011,910 A | 1/2000 | Chau et al. | 395/200 |
| 6,018,770 A | 1/2000 | Little et al. | 709/223 |
| 6,021,496 A | 2/2000 | Dutcher et al. | 713/202 |
| 6,026,165 A * | 2/2000 | Marino et al. | 380/21 |
| 6,044,155 A | 3/2000 | Thomlinson et al. | 380/49 |
| 6,047,376 A | 4/2000 | Hosoe | 713/201 |
| 6,052,785 A * | 4/2000 | Lin et al. | 713/201 |
| 6,055,236 A | 4/2000 | Nessett et al. | 370/389 |
| 6,076,110 A * | 6/2000 | Murphy, Jr. et al. | 709/228 |
| 6,092,196 A | 7/2000 | Reiche | 713/200 |
| 6,094,485 A * | 7/2000 | Weinstein et al. | 380/30 |
| 6,119,160 A | 9/2000 | Zhang et al. | 709/224 |
| 6,141,687 A | 10/2000 | Blair | 709/225 |
| 6,282,652 B1 * | 8/2001 | Scheifler | 713/200 |

* cited by examiner

SECURITY BETWEEN CLIENT AND SERVER IN A COMPUTER NETWORK

BACKGROUND OF THE INVENTION

1. Field of the Invention

The present invention relates to the field of computer networking. More specifically, the present invention relates to improving security between a client and a server in a computer network.

2. The Background Art

The use of computer networks has increased dramatically in recent years, with the rise of the Internet and with more and more businesses creating internal networks to increase worker efficiency. Along with this surge in network usage, however, comes an ever-growing concern over security issues. With highly secretive pieces of information now being placed on computer networks, the potential for serious security breaches is at an all-time high.

Within a computer network, most or all of the pieces of hardware and software programs comply with a series of protocols that define how the network is to operate. Examples of these protocols include Internet Protocol (IP), Remote Authorization Dial In User Server (RADIUS), Terminal Access Controller Access Control System (TACACS), and Internetwork Operating System (IOS).

Figure 1:
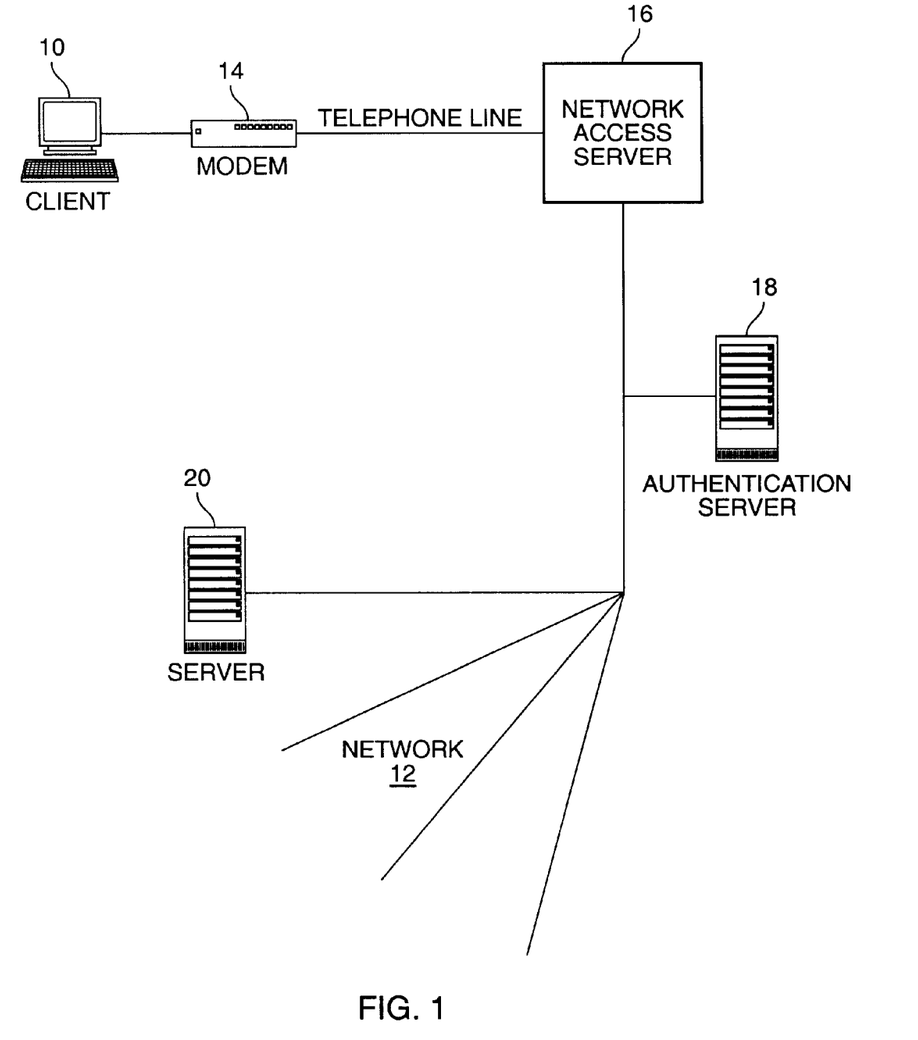
FIG. 1 is a diagram depicting a typical network environment.

FIG. 1 is a diagram depicting a typical network environment. Generally, the act of accessing a computer network proceeds as follows. First, a user uses his or her computer (known as the client) 10 to connect to a computer network 12, either through dialing a phone number through a modem 14 to connect to a network access server 16 or by directly connecting to a network access server 16 on the network. A network access server is a device which has one or more modems, access points, or other communications devices and facilitates access to the network from the outside world. The user may then be prompted for a user name and password, which is then authenticated by an authentication server 18. If the user name and password are accurate, the user is granted access to the network 12.

However, just because the user has access to the network does not mean that the user has access to every piece of information on the network. Many networks have a hierarchy of access privileges, wherein some users are granted unlimited access while some users may have access to only certain types of information. Many times the restricted information is contained on a specific server 20 on the network. This makes it easy to keep users with low-level access privileges (or unauthorized users who nevertheless were able to gain access to the network) from accessing restricted information.

A problem arises, however, in that even without access privileges to a specific server, a user may still be able to determine the location of the server. Typically, when a user requests the restricted information, some sort of database (such as a Domain Name Sever (DNS) or a local configuration) is accessed and the location of the server is acquired. The location of the server may include an Internet Protocol (IP) address as well as a port number. At this point, the client contacts the server and attempts to negotiate a session with it. This is known as the session negotiation phase. While an unauthorized user will not normally be granted access to the server (because during the session negotiation stage the server will determine that the user does not have the proper level of access privileges), the unauthorized user nevertheless has already found out the location of the server.

The information regarding the location of the server may be misused in several ways. First, the user may continuously send a very large number of messages to the server, thus bombarding it with traffic. This could bog down the server to a point where it is not functional, or at least create a logjam on the server such that productivity is severely limited. Second, by knowing the location of the server the client may be able to make many attempts at communications between itself and the server and feel the system out for weak spots. For example, after many attempts at communication, the client may be able to determine the format of data sent from the server, and through cryptoanalysis may then be able to find the key, which unlocks encrypted data. With the key, the client could even impersonate a user with high-level access and may thus be able to break in to the server and steal or change vital information.

After negotiation between a client and server is successful, the session begins the data exchange phase. At this phase, the client sends a request to the server, to which the server responds. The response may involve transmission of data. Another security problem arises when an unauthorized user interrupts a pre-existing session between an authorized user and the server with a request of its own. Since the server is in a mode where it is responding to requests, it may respond to the request of the unauthorized client, thus revealing secured data. Additionally, even if the server does not reveal secured data because it determines that the request was made from an unauthorized user, it will generally still respond in some way, even if it is simply a message stating, in effect, "access denied". This leads to the same potential misuse of the information regarding the server's location as occurred in the session negotiation stage.

Another security concern that arises in network communication is the protection of the data itself as it is transmitted. Numerous encryption schemes have been devised which prevent unauthorized users who manage to gain access to secured data from reading or understanding it. Modern encryption systems are generally based on a cryptographic algorithm, also called a cipher, which is essentially just a mathematical algorithm used for encryption and decryption. Within the algorithm, there is a variable called a key, which is any one of a large number of different values. Generally, the sender and the receiver have a predefined key, and thus nobody can decrypt the encrypted data without knowing the value of that key.

While data encryption has been hugely successful in maintaining data security, there are still several issues that arise. First, it is possible that an unauthorized user may determine the value of the key, and then be able to view encrypted information. Additionally, with the rise of networking capabilities, there has also been a rise in the need for flexibility of systems. A single encryption algorithm may not be sufficient to support the large number of varied devices that communicate across the network.

A concern that arises when trying to remedy these security issues is compatibility. Existing networks have been designed for use with specific protocols and software, and altering them too much may be too much of a burden to place on the operators of the existing networks. It is preferable to have solutions that will not require pre-existing networks to drastically alter the protocols or software currently being used.

BRIEF DESCRIPTION OF THE INVENTION

Improved security between a client and a server in a computer network is provided by allowing either endpoint (the client or the server) to initiate request messages. In this way, it is possible to configure the system so that the server always makes the opening move of negotiation, allowing the location of the server to remain hidden until a legal session is established. Dynamic relocation of the server further hides the location of the server from unauthorized users. Additionally, each message may be authenticated individually as it is received, with the endpoint making no response to an unauthentic message, thus preventing attacks on its security. Finally, negotiation of both the encryption method and the key used in the encryption process allows for the rapid reconfiguration of encryption to protect against unauthorized users who may have broken the code.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

The present invention may utilize a system which transmits data in the form of packets. Each packet may comply with a specific format. Those of ordinary skill in the art will recognize that there are many formats or protocols that may be used in accordance with the present invention. One such protocol, referred to herein as the Control Message Protocol (CMP) is described as follows.

Figure 2:
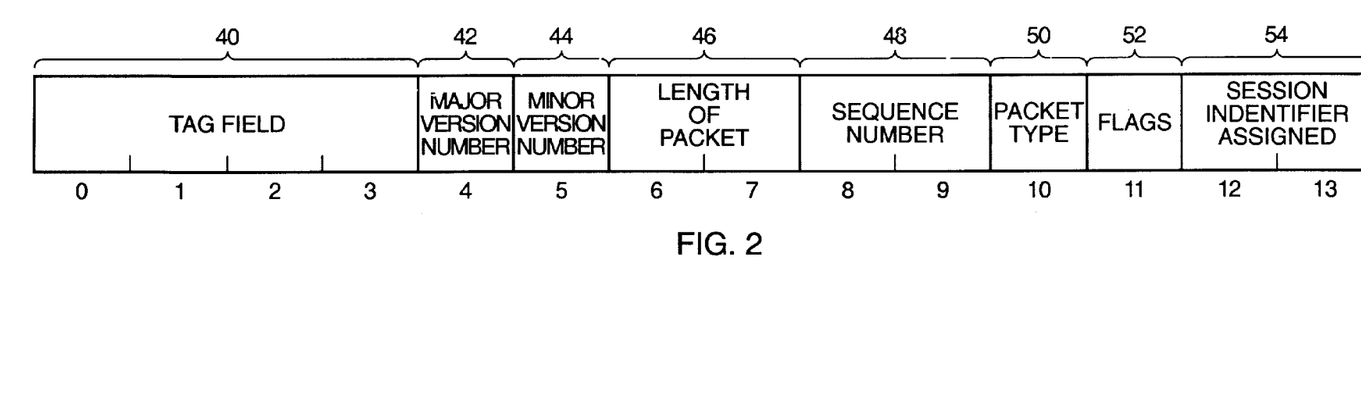
FIG. 2 is a diagram illustrating the header accompanying each packet in a control message protocol in accordance with a presently preferred embodiment of the present invention (CMP).

FIG. 2 is a diagram illustrating the header accompanying each packet. Each header contains a four-byte tag field 40, which contains a protocol signature to allow for speedy filtering and enable applications to support multiple protocols. In this case, the field will contain the value "CMP" (or an equivalent indicator) to indicate the format of the header is in accordance with this particular CMP. The header also preferably contains a one-byte integer value corresponding to the major portion 42 of the protocol version. If CMP is currently running in version 1.0, the value in this field 42 would then be one. Likewise, the one-byte minor portion 44 of the protocol version field would contain the value zero. A two byte length of packet field 46 would preferably indicate the length of the complete packet, including both the header and the body. The two-byte sequence number field 48 may preferably be used for authentication of each packet as will be described later.

A one-byte packet type field 50 would preferably indicate the type of the packet. Possible types may be drawn from Table 1 below. A one byte flag field 52 would preferably contain a descriptor indicating if the packet is encrypted, and a two-byte session identifier 54 would preferably indicate an integer value assigned to represent the current session (if any).

The body of each packet comprises a series of command/attribute vectors. A command vector is an instruction for the received endpoint to do something while an attribute vector is a piece of data to be conveyed to the receiving endpoint. It may be used to describe a command or the result of a command. Each vector preferably has the format shown in Table 2 below.

TABLE 1

| Value | Type | Definition |
| --- | --- | --- |
| 0x01 | Negotiation-Request | A server packet requesting session negotiation |
| 0x02 | Negotiation-Response-Accept | A client packet indicating it agrees to do as required in the request |
| 0x03 | Negotiation-Response-Reject | A client packet indicating it cannot support the services specified in the request |
| 0x04 | Negotiation-Response-Continue | A client packet indicating more negotiation is required |
| 0x05 | Request | A request using a valid session |
| 0x06 | Response-Accept | A positive response to a request |
| 0x07 | Response-Reject | A negative response to a request |
| 0x08 | Response-Continue | The transaction is not complete; a follow on request is expected. |
| 0x09 | Ping | A connectivity and distance test request. This is the only request packet that will be honored when a legal session does not exist. |
| 0x10 | Pong | The response to a ping request. The receiver should only modify the Packet Type field and sends it back without future processing. The receiver can use the round trip time to adjust the timeout of requests. |

TABLE 2

| Byte | Length (in bytes) | Description |
| --- | --- | --- |
| 0 | 1 | Type |
| 1 | 1 | Action/type flags |
| 2 | 2 | Length of Vector |
| 4 | variable | Data |

The action type flags field is preferably a one-byte field indicating how the vector should be treated. It may contain a composite of several flags, each of which has a unique meaning. Logical AND-ing this field with masks defined by the protocol will produce the values of encoded flags. The result of an AND-ing operation of this field with a mask is either zero or non-zero. Table 3 includes a list of the existing masks and their corresponding meaning.

TABLE 3

| Name | Mask Value | Result Interpretation |
| --- | --- | --- |
| ATTRIBUTE | 0x01 | Zero indicates this is an attribute |
| COMMAND | 0x01 | Non-zero indicates this vector is a command |
| REPLY | 0x02 | Non-zero indicates this vector is required in the response |
| CHECK | 0x04 | Non-zero indicates the value in the data field should be verified |
| DISPLAY | 0x08 | Non-zero indicates the value in the data field should be displayed |

The type field contains a value indicating the type of the vector. The possible values in the type field are shown in Table 4 below.

TABLE 4

| Value | Type | Length | Flags | Description |
|---|---|---|---|---|
| 0x01 | User-Message | String | Command, Display | This is a command to display a message to the user. The flags should include the COMMAND and DISPLAY flags. If DISPLAY is specified, the value in the data field is a string to be displayed to the user. |
| 0x02 | Change-Password | String | Command or Attribute, Display, Check | This is a command to begin the change password process. The flags should include the COMMAND flag. If DISPLAY flag is included, the value in the data field is a string message to be displayed to the user. |
| 0x03 | Get-Input | String | Command, Display | This command gets the user input. The flags should include the COMMAND flag. If DISPLAY flag is also included, the value in the data field is a string to be displayed to the user. |
| 0x04 | Connection-Terminate | None | Command | This is a command instructing the client to perform a disconnection. The flags should include the COMMAND flag. |
| 0x05 | User-Id | String | Command or Attribute, Reply | This vector could be an attribute with the user id string in the data field or a command to require an id in the response. If the ATTRIBUTE flag is the only flag specified, the value in the data field will contain the user id string. If the reply flag is also included, this vector is a command and the data field can be ignored. As a command, it requires a User-ID vector with the valid data in the response packet. |
| 0x06 | Password | String | Attribute, Check | This is a string attribute containing the password entered by the user. The flags should include the ATTRIBUTE and CHECK flags. Where two password attributes are contained in a Response-Accept packet, the first Password attribute is interpreted as the old password and the second Password attribute is the new password. |
| 0x07 | Password-Type | String | Attribute, Display | This is a string attribute describing one or a list of password types. If used to specify a list of password types, the types are separated by colon (':') characters. It can occur in both request and response packets. If found in a request, it must occur along with a Change-Password command vector. In such a case, it will contain either the type of the password to be modified or a list to be selected from. An example of a list would be "PAP:CHAP:NT". If found in a response, it must occur along with one or more Password attributes. In such a case, it describing the type of the password enclosed. |
| 0x08 | User-Response | String | Attribute | This is a string attribute containing the data entered by the user. The flags field should include the ATTRIBUTE flag. |
| 0x09 | Encryption-Method | Byte | Attribute | This is an attribute indicating the encryption method to be used. The flags should include the ATTRIBUTE flag. The value in the data field is a single-octet integer matching one of the following values:<br>No encryption = 0x00<br>MD5-Digestion = 0x01<br>DES-Digestion = 0x02 |
| 0xA | Session-Key | Word | Attribute | This is an attribute describing the key or the value to compute the key with for the session being negotiated. |
| 0xB | Server-Port | Word | Attribute | This is an attribute specifying the UDP port at which the server will be accepting client requests on. The flags should include the ATTRIBUTE flag. The value in the data field is an unsigned integer in the network byte order. |
| 0xC | Session-Terminated | None | Command | This is a command notifying that the current session is to be aborted and a new session is required to continue communication |
| 0xD | Timeout | Word | Attribute | This is an attribute vector to specify the duration (in minutes) a response is expected. A value of zero indicates no timeout. This vector is commonly used when the requester expects the response to be deferred by the recipient. It allows the requester to limit the duration of the deferred period. For an example, if the server needs to limit the time it is willing to wait for the passwords in a change password request (e.g. 30 minutes), it would include this vector in the original change password request. in such a case, the vector indicates the duration the server is willing to wait until the deferred response is received (NOT the immediate response). |
| 0xE | Abort-Outstanding | None | Command | This command instructs the recipient to discard or to treat an outstanding request as if it has been rejected. This vector is commonly used in a follow on request. |

Typical request-response protocols, such as RADIUS and TACACS require that one of the end points, usually the client, always be the requestor while the other always be the responder. However, by allowing either end point to initiate requests, it allows the end points to switch roles as needed. Since almost every system wants to allow the client to initiate requests, this new feature also allows the server to initiate requests. There are several advantages to having the server be capable of initiating requests.

Figure 3:
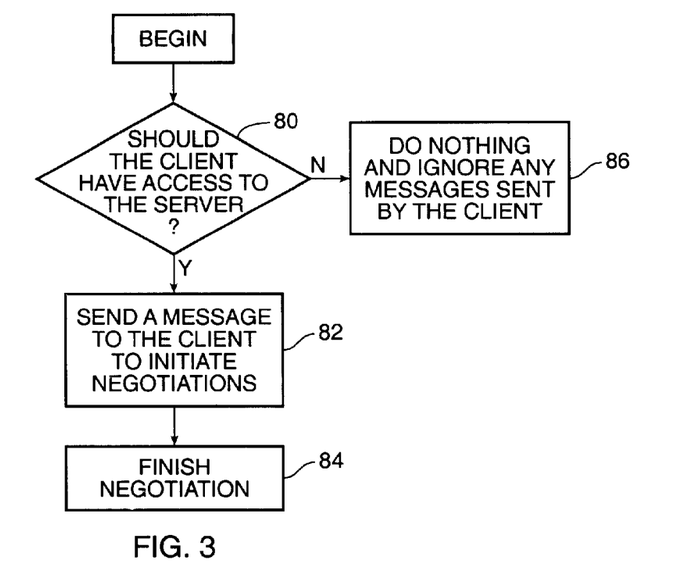
FIG. 3 is a flow diagram illustrating a server negotiating a session with a client logged on to a network in accordance with a presently preferred embodiment of the present invention.

During the session negotiation phase, it is now possible, in accordance with this presently preferred embodiment of the present invention, to have the server initiate the first request of the negotiation (i.e. to make the opening move). This allows the location of the server to remain hidden from an unauthorized client. FIG. 3 is a flow diagram illustrating this method for a server to negotiate a session with a client logged on to a network in accordance with this preferred embodiment of the present invention.

At step 80, the server determines if the client should have access to the server. This step may take many forms, but the most likely occurrence is for the authentication server, or a similar part of the network that performs authentication functions, to send a message to the server indicating that a client who should have access to the server has logged on. The authentication server would most likely have checked a user name and password against a database containing user profiles, the corresponding user profile indicating that the client should have access to the server.

If it is determined that the client should have access to the server, the process moves to step 82, where the server sends a message to the client to initiate negotiations for a session. Each message sent from the server will contain its location, so the client will then have information regarding how to send messages to the server. Since the user has been cleared for access to the server by that point, however, the security risk is minimal. Then negotiations may be completed as normal at step 84. If, on the other hand, it is determined that the client should not have access to the server, the process moves to step 86, and the server will simply do nothing. At this step, should it receive a request from the client, it will simply ignore it. By not initiating contact and ignoring all requests, the server will not reveal its location to any unauthorized users, thus preventing subsequent attacks on the server.

The server may also ignore any requests from the user before the user has been authenticated as being authorized to access the server, treating every user as a potential threat until it is convinced the user has authorization.

The one possible exception to this rule is in the case of ping requests. A ping request is a message sent from an end point to another end point to test for connectivity and distance between the two end points. The normal response to a ping request is a pong message. A pong message simply makes unsubstantial changes to the ping message and sends it back without further processing. In accordance with a presently preferred embodiment of the present invention, a pong message is formed by simply modifying the packet type field in the header of the packet and sending it back. For this reason, a pong message does not reveal the location of the end point that sends it. It also does not reveal any of the underlying characteristics of the server, such as its negotiation style. Because there is no security threat in sending a pong message in accordance with this method, the server may go ahead and send one even when a legal session does not exist.

An added advantage of having the server always initiate session negotiations is that it is not necessary for the network to maintain a DNS or similar entry regarding the server. By eliminating the ability of users to find the location of the server through such entries, the security of the network is greatly enhanced. Additionally, the memory normally accorded to tracking such entries will be saved and may be used for other applications.

Without a DNS or similar entry forcing the server to remain at a stationary location (or to go through a lot of trouble to change the DNS or similar entry in order to relocate), the server may now dynamically relocate itself, either between sessions or even in the middle of the data exchange phase of a session. This will normally involve simply changing its port number. It may also involve changing its actual address (such as an IP address), but such a drastic relocation does not provide a significant increase in security over simply changing the port number and places a larger burden on the network. By periodically dynamically relocating, the server further protects against unauthorized users from determining its location. When dynamically relocating between sessions, the server need not inform any other device on the network that it is altering its location, since when in negotiations for a session originate, the server sends the opening message, which informs the client of its location. When the server dynamically relocates itself during a session, however, the process may be a little more complicated.

Figure 4:
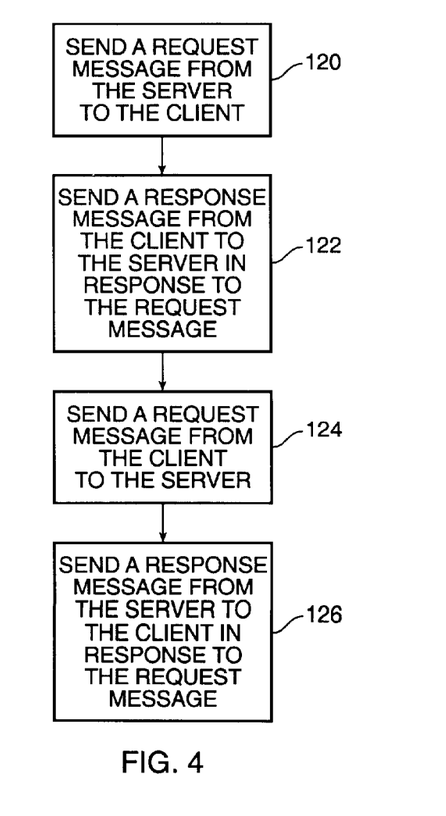
FIG. 4 is a flow diagram illustrating a method for network communication between a client and a server during a negotiated session in accordance with another presently preferred embodiment of the present invention.

During the session, the system now has the capability of bidirectional messaging. Either the server or the client may initiate requests. FIG. 4 is a flow diagram illustrating a method for network communication between a client and a server during a negotiated session in accordance with a second embodiment of the present invention.

At step 120, the server may send a request message to the client. At step 122, the client will respond to this request message with a response message. At step 124, the client may send a request message to the server. Then at step 126, the server will respond with a response message. These steps may be performed in any order, although generally an endpoint will only send a response message after receiving a request message.

The bidirectional messaging capability allows the server to dynamically relocate at any time during the session. For the most part, the client will be informed of the new location of the server when the server next sends a message to the client, as the server's location will be contained in the header of the message. In certain instances, however, it may be necessary for the server to take active steps to inform the client that it has in relocated. These active steps will normally involve sending a special message to the client simply to inform the client of its new location, or a "relocation message". Of course, since nearly every type of message sent from the server to the client will reveal its location, the "relocation message" may actually be just about any type of message.

The instances in which a relocation message is necessary will be those situations where the server foresees the client sending a message to it before it sends a message to the client. This may depend on the type of system that is being used and the timing of the messages, among other factors.

Even utilizing the security measures outlined above, there is still a threat that an unauthorized user may gain access to secured information or at least determine the location of the server. One way this is accomplished is by an unauthorized user breaking in to the middle of a session between an authorized user and a server and issuing a request of its own. The server may not realize that the request comes from an unauthorized user and may transmit secured information. Additionally, the server may recognize that the request came from an unauthorized client and send an "access denied" or similar message, which would reveal its location to the unauthorized client.

By taking additional steps, however, it is possible for both the server and the client to authenticate each packet of information as it is received. If the packet is deemed to have been sent from an unauthorized source, the recipient can choose simply to not respond to it, thus not revealing its location or sending any secured information. While it makes more sense for this to come up in the case of a server dealing with an unauthorized client, it is also possible for a client to receive a request from an unauthorized server. One of the advantages of the solution presented by the present invention is that it allows bidirectional authentication of packets.

Figure 5:
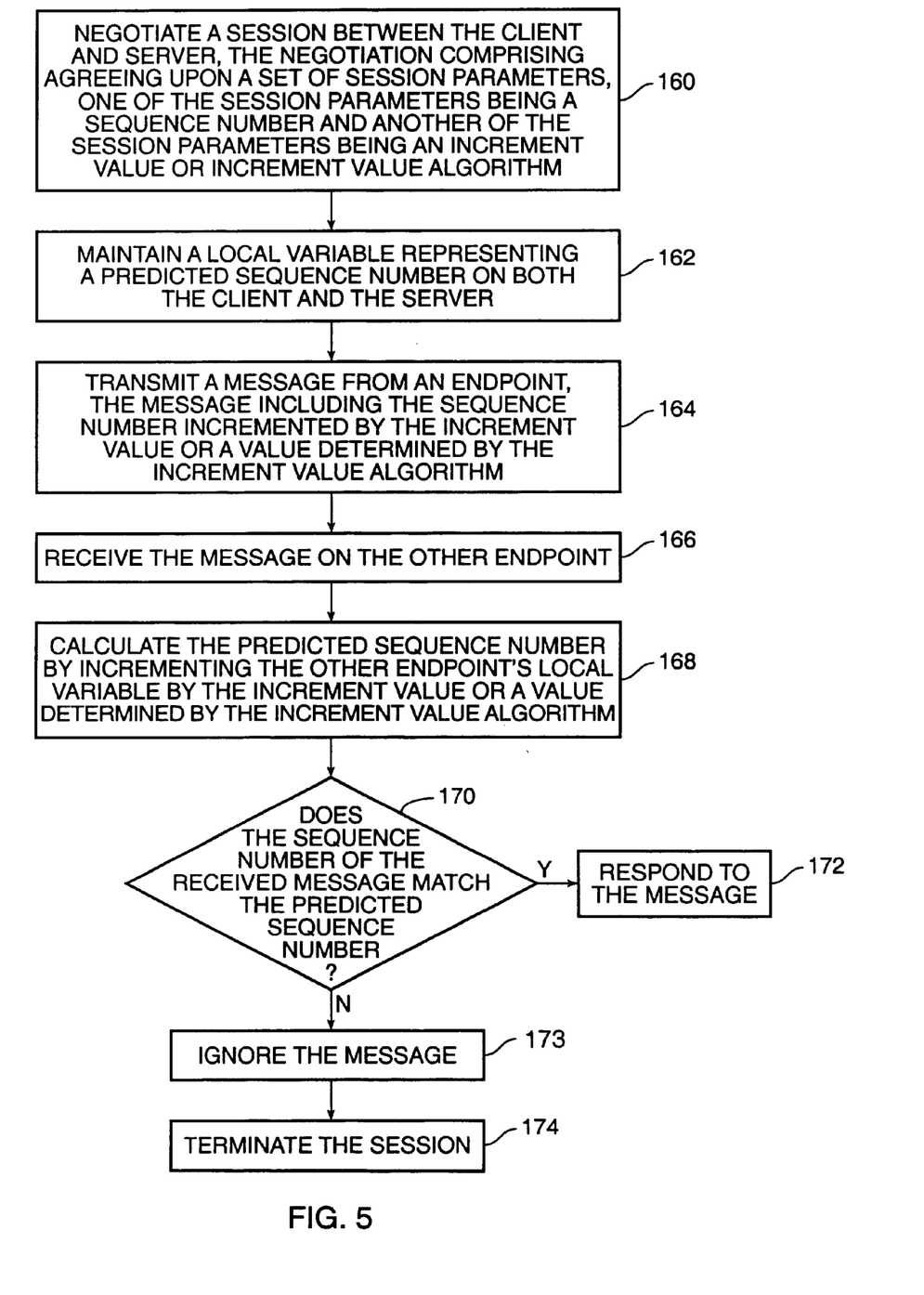
FIG. 5 is a flow diagram illustrating a method for securely communicating between a client and a server in accordance with another presently preferred embodiment of the present invention.

FIG. 5 is a flow diagram illustrating a method for securely communicating between a client and a server in accordance with another presently preferred embodiment of the present invention. A sequence number may be used to authenticate each message as follows. At step 160, during session negotiation, two additional parameters may be negotiated. These will be a starting sequence number and an increment value or increment value algorithm. The starting sequence number is simply an integer representing the value at which the sequence number will begin. This is relatively easy to negotiate, because there is no reason for either the client or server to have a preference as to this number—it is simply a matter of making sure that both client and server have agreed to a single starting sequence number. The server and client must also agree to a way to increment the sequence number for each message sent. This may be simply an increment value. For example, client and server may agree to increment the sequence number by two each time a packet is sent. They may instead agree on an increment value algorithm, with the algorithm calculated each time a packet is sent to determine how much to increment the sequence number. In some ways, using an increment value algorithm is similar to a key used for encryption/decryption, and therefore is more secure.

At step 162, both the server and client maintain a record of the last sequence number that they transmitted, respectively (or any other way to track the sequence numbers) throughout the session. Then at step 164, each time a message is transmitted from an endpoint, the endpoint increments the sequence number by the agreed-upon increment value or a value computed using the agreed-upon increment value algorithm. The incremented sequence number is then stored in a field of the message (in CMP, this would be the sequence number field 48 depicted in FIG. 2). Then, when a message is received by either endpoint at step 166, it checks its local database to determine the sequence number of the last message it transmitted and increments it using the increment value or increment value algorithm to arrive at a predicted sequence number (step 168). At step 170, it then compares this predicted sequence number with the sequence number in the header of the packet it just received. If the numbers match, the packet is from an authenticated source, and may be responded to without fear of security implications at step 172. If the numbers do not match, the packet is not from an authenticated source, and the packet received should not be responded to in any way (step 173), since any response would give away the current location of the endpoint. At step 174, the endpoint may then terminate the session if it chooses.

Utilizing a sequence number is only one way to authenticate individual packets. However, whichever way is chosen to accomplish the authentication, by not responding to an unauthentic packet, the server (or client) does not reveal either secured information or its location, thus increasing the security of the system.

In order to address concerns about encryption, it is possible to negotiate an encryption method and key during the negotiation phase utilizing the CMP protocol. This begins with an endpoint sending a packet similar to the one shown in Table 5 below.

TABLE 5

| Offset | Value |
|---|---|
| 0 | "CMP" |
| 4 | 1 |
| 5 | 0 |
| 6 | 19 |
| 8 | 1 |
| 10 | 0x01 (Negotiation-Request) |
| 11 | 0x00 (Not Encrypted) |
| 12 | 2324 |
| 14 | 0x09 (Encryption-Method) |
| 15 | 0x06 (ATTRIBUTE|CHECK|REPLY) |
| 16 | 5 |
| 18 | 0x01 (MD5-Digestion) |

The first fourteen bytes are the header of the packet. Byte 10 indicates that the packet is a negotiation request, while byte 11 indicates that this packet is not encrypted. Bytes 14–18 are the body of the packet. Byte 14 indicates that this packet contains information the encryption method to be used during the session. Byte 15 indicates that the faction/type flags are ATTRIBUTE, CHECK, and REPLY, indicating that the body contains an attribute, the value in the data field should be verified, and the vector should be used in the reply. Byte 18 indicates that the preferred method of encryption is MD5-Digestion.

If the other endpoint supports MD5-Digestion encryption, it will send back the Negotiation-Response-Accept packet shown in Table 6 below.

TABLE 6

| Offset | Value |
|---|---|
| 0 | "CMP" |
| 4 | 1 |
| 5 | 0 |
| 6 | 14 |
| 8 | 1 |
| 10 | 0x02 (Negotiation-Request-Accept) |
| 11 | 0x00 (Not Encrypted) |
| 12 | 2324 |

If the other endpoint does not support MD5-Digestion encryption it will send back the Negotiation-Response-Continue packet specifying an encryption method it can support, or that it does not support any type of encryption, such as the packet shown in Table 7 below.

TABLE 7

| Offset | Value |
|---|---|
| 0 | "CMP" |
| 4 | 1 |
| 5 | 0 |
| 6 | 19 |
| 8 | 1 |
| 10 | 0x04 (Negotiation-Response-Continue) |
| 11 | 0x00 (Not Encrypted) |
| 12 | 2324 |
| 14 | 0x09 (Encryption-Method) |
| 15 | 0x04 (ATTRIBUTE|CHECK) |
| 16 | 5 |
| 18 | 0x00 (No Encryption) |

A similar method may be used to negotiate the key as well. By negotiating the encryption method and key rather than having one or both fixed, the system automatically becomes much more flexible and secure. The system is better equipped to handle new encryption methods as they are created, and the server may now choose to alter the encryption method p
or the key if it feels there is a security threat imminent.

The present invention allows for increased security in a network environment, while maintaining compatibility with existing network protocols, and thus not necessitating the drastic alterations of the network environment to implement.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for a server to establish a network session with a client logged on to a network, including:

receiving a packet from an authentication server indicating that the client should have access to the server;

sending a message to the client to initiate session negotiation if the client should have access to the server; and negotiating a session with the client if the client should have access to the server.

2. The method of claim 1, wherein said determining includes receiving a message from an authentication server indicating whether the client should have access to the server.

3. The method of claim 1, wherein said sending includes sending a message to the client which indicates the location of the server, keeping the location of the server hidden from the client until the client is deemed to have the appropriate access privileges to the server.

4. The method of claim 1, further including ignoring any message sent from the client to the server if the client should not have access to the server, and ignoring any message sent from the client to the server before it is determined if the client should have access to the server.

5. The method of claim 1, further including ignoring any message except a ping request sent from the client to the server if the client should not have access to the server, and ignoring any message except a ping request sent from the client to the server before it is determined if the client should have access to the server.

6. The method of claim 5, further including responding to a ping request with a pong message.

7. The method of claim 1, further including dynamically relocating the server.

8. The method of claim 7, wherein said dynamically relocating includes changing the server's port address.

9. The method of claim 7, wherein said dynamically relocating includes changing the server's IP address.

10. The method of claim 1, wherein said negotiating comprises agreeing with the client upon a set of session parameters, one of said session parameters being an encryption method and another of said session parameters being a key.

11. The method of claim 10, further including communicating with the client during said session by encrypting data using said encryption method and said key, sending the data through the network, and then decrypting said data using said encryption method and said key.

12. A method for network communication between a client and a server during a negotiated session, including:
   sending a first request message from the server to the client;
   sending a first response message from the client to the server in response to said first request message;
   sending a second request message from the client to the server;
   sending a second response message from the server to the client in response to said second request message; and
   dynamically relocating the server.

13. The method of claim 12, further including:
   sending a message from the server to the client indicating that the server has dynamically relocated and informing the client of the new location if it is reasonably possible that the client will send a message to it before it sends a message to the client.

14. The method of claim 12, wherein said dynamically relocating includes changing the server's port address.

15. The method of claim 12, wherein said dynamically relocating includes changing the server's IP address.

16. The method of claim 12, wherein negotiation of the session involves agreeing upon a set of session parameters, one of said session parameters being an encryption method and another of said session parameters being a key.

17. The method of claim 16, wherein the data contained in said first request message, said first response message, said second request message, and said second response message has been encrypted using said encryption method and said key and is decrypted using said encryption method and said key.

18. A method of network communication between a server and a client logged on to a network including:
   receiving a packet from an authentication server indicating that the client should have access to the server;
   sending a message to the client to initiate session negotiation if the client should have access to the server;
   negotiating a session between the client and the server if the client should have access to the server;
   sending a first request message from the server to the client during said session;
   sending a first response message from the client to the server in response to said first request message during said session;
   sending a second request message from the client to the server during said session; and
   sending a second response message from the server to the client in response to said second request message during said session.

19. The method of claim 18, wherein said determining includes receiving a message from an authentication server indicating whether the client should have access to the server.

20. The method of claim 18, wherein said sending a message to the client to initiate session negotiation includes sending a message to the client which indicates the location of the server, keeping the location of the server hidden from the client until the client is deemed to have the appropriate access privileges.

21. The method of claim 18, further including ignoring any message sent from the client to the server if the client should not have access to the server, and ignoring any message sent from the client to the server before it is determined if the client should have access to the server.

22. The method of claim 18, further including ignoring any message except a ping request sent from the client to the server if the client should not have access to the server, and ignoring any message except a ping request sent from the client to the server before it is determined if the client should have access to the server.

23. The method of claim 22, further including responding to a ping request with a pong message.

24. The method of claim 18, further including dynamically relocating the server.

25. The method of claim 24, wherein said dynamically relocating includes changing the server's port address.

26. The method of claim 24, wherein said dynamically relocating includes changing the server's IP address.

27. The method of claim 18, wherein said negotiating involves agreeing upon a set of session parameters, one of said session parameters being an encryption method and another of said session parameters being a key.

28. The method of claim 27, wherein the data contained in said first request message, said first response message, said second request message, and said second response message has been encrypted using said encryption method and said key and is decrypted using said encryption method and said key.

29. A method for network communication between a server and a client logged on to a network including:
   receiving a packet from an authentication server indicating that the client should have access to the server;
   sending a message to the client to initiate session negotiation if the client should have access to the server;
   negotiating a session between the server and the client if the client should have access to the server, said negotiating comprising agreeing upon a set of session parameters, one of said session parameters being a sequence number and another of said session parameters being an increment value or increment value algorithm;

communicating between the server and client during said session by transmitting messages between the server and client, each message including said sequence number;

incrementing said sequence number by said increment value or a value determined by said increment value algorithm each time a message is transmitted;

checking whether said sequence number matches a predicted sequence number each time a message is received by the client or the server; and ignoring a received message if the sequence number of said received message does not match said predicted sequence number.

30. The method of claim 29, wherein said sending includes sending a message to the client which indicates the location of the server, keeping the location of the server hidden from the client until the client is deemed to have the appropriate access privileges to the server.

31. The method of claim 29, further including ignoring any message sent from the client to the server if the client should not have access to the server, and ignoring any message sent from the client to the server before it is determined if the client should have access to the server.

32. The method of claim 29, further including ignoring any message except a ping request sent from the client to the server if the client should not have access to the server, and ignoring any message except a ping request sent from the client to the server before it is determined if the client should have access to the server.

33. The method of claim 32, further including responding to a ping request with a pong message.

34. The method of claim 29, further including dynamically relocating the server.

35. The method of claim 29, wherein said predicted sequence number is computed by:

maintaining a local variable representing said predicted sequence number on both the client and the server;

incrementing said local variable on the server by said increment value or a value determined by said increment value algorithm each time the server receives a message from the client; and incrementing said local variable on the client by said increment value or a value determined by said increment value algorithm each time the client receives a message from the server.

36. The method of claim 29, further including:

terminating the session if the sequence number of a received message does not match said predicted sequence number.

37. The method of claim 29, wherein said another of said session parameters agreed upon during said negotiation step is an encryption method and another of said session parameters agreed upon during said negotiation step is a key.

38. The method of claim 37, wherein said communicating includes:

encrypting said messages using said encryption method and said key;

sending the messages through the network; and decrypting said data using said encryption method and said key.

39. A method for network communication between a server and a client logged on to a network, including:

receiving a packet from an authentication server indicating that the client should have access to the server;

sending a message to the client to initiate session negotiation if the client should have access to the server;

negotiating a session between the server and the client if the client should have access to the server, said negotiating comprising agreeing upon a set of session parameters, one of said session parameters being a sequence number and another of said session parameters being an increment value or increment value algorithm;

communicating between the server and client during said session by transmitting messages between the server and client, wherein said communicating involves sending a request message from either the client to the server or the server to the client, and then sending a response message in the other direction in response to said request message, each message including said sequence number;

incrementing said sequence number by said increment value or a value determined by said increment value algorithm each time a message is transmitted;

checking whether said sequence number matches a predicted sequence number each time a message is received by the client or the server; and ignoring a received message if the sequence number of said received message does not match said predicted sequence number.

40. The method of claim 39, wherein said sending includes sending a message to the client which indicates the location of the server, keeping the location of the server hidden from the client until the client is deemed to have the appropriate access privileges.

41. The method of claim 39, further including ignoring any message sent from the client to the server if the client should not have access to the server, and ignoring any message sent from the client to the server before it is determined if the client should have access to the server.

42. The method of claim 39, further including ignoring any message except a ping request sent from the client to the server if the client should not have access to the server, and ignoring any message except a ping request sent from the client to the server before it is determined if the client should have access to the server.

43. The method of claim 42, further including responding to a ping request with a pong message.

44. The method of claim 39, further including dynamically relocating the server.

45. The method of claim 44, wherein said dynamically relocating includes changing the server's port address.

46. The method of claim 44, wherein said dynamically relocating includes changing the server's IP address.

47. The method of claim 39, wherein said predicted sequence number is computed by:

maintaining a local variable representing said predicted sequence number on both the client and the server;

incrementing said local variable on the server by said increment value or a value determined by said increment value algorithm each time the server receives a message from the client; and incrementing said local variable on the client by said increment value or a value determined by said increment value algorithm each time the client receives a message from the server.

48. The method of claim 39, further including:

terminating the session if the sequence number of a received message does not match said predicted sequence number.

49. The method of claim 39, wherein said another of said session parameters agreed upon during said negotiation step is an encryption method and another of said session parameters agreed upon during said negotiation step is a key.

50. The method of claim 39, wherein said communicating includes:
   encrypting said messages using said encryption method and said key;
   sending the messages through the network; and
   decrypting said data using said encryption method and said key.

51. A server for use in a computer network, including:
   an access determiner which determines if a client logged on to the network should have access to the server;
   a session initiator, which sends a message to said client to initiate session negotiation if said client should have access to the server; and
   a negotiator, which negotiates a session between the server and said client if said client should have access to the server.

52. The server of claim 51, wherein said access determiner receives a message from an authentication server indicating whether said client should have access to the server.

53. The server of claim 51, wherein said message indicates the location of the server.

54. The server of claim 51, wherein said server ignores any message sent from said client if said client should not have access to said server, and ignores any message sent from said client before it is determined if said client should have access to the server.

55. The server of claim 51, wherein said server ignores any message except a ping request sent from said client if said client should not have access to the server, and ignores any message except a ping request sent from said client before it is determined if said client should have access to said server.

56. The server of claim 55, wherein said server responds to said ping request with a pong message.

57. The server of claim 51, wherein said server dynamically relocates itself.

58. The server of claim 51, wherein said negotiator negotiates an encryption method and a key.

59. A computer network including:
   a server designed to send a first request message to a client;
   a client designed to send a first response message to said server in response to said first request message;
   said client further designed to send a second request message to said server;
   said server further designed to send a second response message to said client in response to said second request message; and
   said server further designed to dynamically relocate itself.

60. The computer network of claim 59, wherein said server is further designed to send a message to said client indicating that the server has dynamically relocated itself and informing said client of its new location.

61. A computer network including:
   a server having an access determiner which determines if a client logged on to the network should have access to the server;
   said server further having a session initiator, which sends a message to said client to initiate session negotiation if said client should have access to the server; and
   said server further having a negotiator, which negotiates a session between the server and said client if said client should have access to the server,
   said server designed to send a first request message to a client during said session;
   said client designed to send a first response message to said server in response to said first request message during said session;
   said client further designed to send a second request message to said server during said session; and
   said server further designed to send a second response message to said client in response to said second request message during said session.

62. The computer network of claim 61, wherein said access determiner receives a message from an authentication server indicating whether said client should have access to the server.

63. The computer network of claim 61, wherein said message indicates the location of the server.

64. The computer network of claim 61, wherein said server ignores any message sent from said client if said client should not have access to said server, and ignores any message sent from said client before it is determined if said client should have access to the server.

65. The computer network of claim 61, wherein said server ignores any message except a ping request sent from said client if said client should not have access to the server, and ignores any message except a ping request sent from said client before it is determined if said client should have access to said server.

66. The computer network of claim 65, wherein said server responds to said ping request with a pong message.

67. The computer network of claim 61, wherein said server dynamically relocates itself.

68. The computer network of claim 61, wherein said negotiator negotiates an encryption method and a key.

69. The computer network of claim 61, wherein said server dynamically relocates itself and sends a message to said client indicating that the server has dynamically relocated itself and informing said client of its new location.

70. An apparatus for allowing a server to establish a network session with a client logged on to a network, comprising:
   means for receiving a packet from an authentication server indicating that the client should have access to the server;
   means for sending a message to the client to initiate session negotiation if the client should have access to the server; and
   means for negotiating a session with the client if the client should have access to the server.

71. The apparatus of claim 70, wherein said means for determining includes means for receiving a message from an authentication server indicating whether the client should have access to the server.

72. The apparatus of claim 70, wherein said means for sending includes means for sending a message to the client which indicates the location of the server, keeping the location of the server hidden from the client until the client is deemed to have the appropriate access privileges to the server.

73. The apparatus of claim 70, further including means for ignoring any message sent from the client to the server if the client should not have access to the server, and ignoring any message sent from the client to the server before it is determined if the client should have access to the server.

74. The apparatus of claim 70, further including means for ignoring any message except a ping request sent from the client to the server if the client should not have access to the server, and ignoring any message except a ping request sent from the client to the server before it is determined if the client should have access to the server.

75. The apparatus of claim 74, further including means for responding to a ping request with a pong message.

76. The apparatus of claim 70, further including means for dynamically relocating the server.

77. The apparatus of claim 76, wherein said means for dynamically relocating includes means for changing the server's port address.

78. The apparatus of claim 76, wherein said means for dynamically relocating includes means for changing the server's IP address.

79. The apparatus of claim 70, wherein said means for negotiating comprises means for agreeing with the client upon a set of session parameters, one of said session parameters being an encryption method and another of said session parameters being a key.

80. The apparatus of claim 79, further including means for communicating with the client during said session by encrypting data using said encryption method and said key, sending the data through the network, and then decrypting said data using said encryption method and said key.

81. A program storage device readable by a machine, tangibly embodying a program of instructions executable by the machine to perform a method for a server to establish a network session with a client logged on to a network, the method comprising:
   receiving a packet from an authentication server indicating that the client should have access to the server;
   sending a message to the client to initiate session negotiation if the client should have access to the server; and
   negotiating a session with the client if the client should have access to the server.

82. A program storage device readable by a machine, tangibly embodying a program of instructions executable by the machine to perform a method for network communication between a client and a server during a negotiated session, the method comprising:
   sending a first request message from the server to the client;
   sending a first response message from the client to the server in response to said first request message;
   sending a second request message from the client to the server;
   sending a second response message from the server to the client in response to said second request message; and
   dynamically relocating the server.

83. A program storage device readable by a machine, tangibly embodying a program of instructions executable by the machine to perform a method for network communication between a server and a client logged on to a network, the method comprising:
   receiving a packet from an authentication server indicating that the client should have access to the server;
   sending a message to the client to initiate session negotiation if the client should have access to the server;
   negotiating a session between the client and the server if the client should have access to the server;
   sending a first request message from the server to the client during said session;
   sending a first response message from the client to the server in response to said first request message during said session;
   sending a second request message from the client to the server during said session; and
   sending a second response message from the server to the client in response to said second request message during said session.

84. A program storage device readable by a machine, tangibly embodying a program of instructions executable by the machine to perform a method for network communication between a server and a client logged on to a network, the method comprising:
   receiving a packet from an authentication server indicating that the client should have access to the server;
   sending a message to the client to initiate session negotiation if the client should have access to the server;
   negotiating a session between the server and the client if the client should have access to the server, said negotiating comprising agreeing upon a set of session parameters, one of said session parameters being a sequence number and another of said session parameters being an increment value or increment value algorithm;
   communicating between the server and client during said session by transmitting messages between the server and client, each message including said sequence number;
   incrementing said sequence number by said increment value or a value determined by said increment value algorithm each time a message is transmitted;
   checking whether said sequence number matches a predicted sequence number each time a message is received by the client or the server; and
   ignoring a received message if the sequence number of said received message does not match said predicted sequence number.

85. A program storage device readable by a machine, tangibly embodying a program of instructions executable by the machine to perform a method for network communication between a server and a client logged on to a network, the method comprising:
   receiving a packet from an authentication server indicating that the client should have access to the server;
   sending a message to the client to initiate session negotiation if the client should have access to the server;
   negotiating a session between the server and the client if the client should have access to the server, said negotiating comprising agreeing upon a set of session parameters, one of said session parameters being a sequence number and another of said session parameters being an increment value or increment value algorithm;
   communicating between the server and client during said session by transmitting messages between the server and client, wherein said communicating involves sending a request message from either the client to the server or the server to the client, and then sending a response message in the other direction in response to said request message, each message including said sequence number;
   incrementing said sequence number by said increment value or a value determined by said increment value algorithm each time a message is transmitted;
   checking whether said sequence number matches a predicted sequence number each time a message is received by the client or the server; and
   ignoring a received message if the sequence number of said received message does not match said predicted sequence number.

86. A server for use in a computer network, including:
- an authentication packet receiver, which receives a packet from an authentication server indicating that a client should have access to the server;
- a session initiator, which sends a message to said client to initiate session negotiation if said client should have access to the server;
- a negotiator, which negotiates a session between the server and said client if said client should have access to the server, said negotiating comprising agreeing upon a set of session parameters, one of said session parameters being a sequence number and another of said session parameters being an increment value or increment value algorithm;
- a transmitter, which communicates between the server and client by transmitting messages between the server and client, wherein said communicating involves sending a request message from the server to the client and awaiting a response message, or receiving a request message from said client and sending a response message to the client, each message including a sequence number, and wherein a received message is ignored if the sequence number of said received message does not match said predicted sequence number;
- a sequence number incrementer, which increments said sequence number by said increment value or a value determined by said increment value algorithm each time a message is transmitted; and
- a sequence number checker, which checks whether said sequence number matches a predicted sequence number each time a message is received by the server.

87. The server of claim 86, wherein said session initiator further sends a message to the client which indicates the location of the server, keeping the location of the server hidden from the client until the client is deemed to have appropriate access privileges.

88. The server of claim 86, wherein said transmitter further ignores any message sent from the client to the server if the client should not have access to the server, and ignores any message sent from the client to the server before it is determined if the client should have access to the server.

89. The server of claim 86, wherein said transmitter further ignores any message except a ping request sent from the client to the server if the client should not have access to the server, and ignores any message except a ping request sent from the client to the server before it is determined if the client should have access to the server.

90. The server of claim 89, further including a ping responder, which responds to a ping request with a pong message.

91. The server of claim 86, further including a dynamic server relocator, which dynamically relocates the server.

92. The server of claim 91, wherein said dynamic server relocator dynamically relocates the server by changing the server's port address.

93. The server of claim 91, wherein said dynamic server relocator dynamically relocates the server by changing the server's Internet Protocol (IP) address.

94. The server of claim 86, wherein said predicted sequence number is computed by:
- maintaining a local variable on the server representing said predicted sequence number; and
- incrementing said local variable on the server by said increment value or a value determined by said increment value algorithm each time the server receives a message from the client.

95. The server of claim 86, further including a session terminator, which terminates the session if the sequence number of a received message does not match said predicted sequence number.

96. The server of claim 86, wherein another of said session parameters agreed upon during negotiation is an encryption method and another of said session parameters agreed upon during said negotiation is a key.

97. The server of claim 86, wherein said transmitter encrypts said messages using said encryption method and said key and sends the messages through the network.

98. An apparatus for network communication between a server and a client logged on to a network, including:
- means for receiving a packet from an authentication server indicating that the client should have access to the server;
- means for sending a message to the client to initiate session negotiation if the client should have access to the server;
- means for negotiating a session between the server and the client if the client should have access to the server, said negotiating comprising agreeing upon a set of session parameters, one of said session parameters being a sequence number and another of said session parameters being an increment value or increment value algorithm;
- means for communicating between the server and client during said session by transmitting messages between the server and client, wherein said communicating involves sending a request message from the server to the client and awaiting a response message, or receiving a request message from said client and sending a response message to said client, each message including said sequence number and wherein a received message is ignored if the sequence number of said received message does not match said predicted sequence number;
- means for incrementing said sequence number by said increment value or a value determined by said increment value algorithm each time a message is transmitted; and
- means for checking whether said sequence number matches a predicted sequence number each time a message is received by the server.

99. The apparatus of claim 98, wherein said means for sending includes means for sending a message to the client which indicates the location of the server, keeping the location of the server hidden from the client until the client is deemed to have the appropriate access privileges.

100. The apparatus of claim 98, wherein said means for communicating further ignores any message sent from the client to the server if the client should not have access to the server, and ignores any message sent from the client to the server before it is determined if the client should have access to the server.

101. The apparatus of claim 98, wherein said means for communicating further ignores any message except a ping request sent from the client to the server if the client should not have access to the server, and ignoring any message except a ping request sent from the client to the server before it is determined if the client should have access to the server.

102. The apparatus of claim 101, further including means for responding to a ping request with a pong message.

103. The apparatus of claim 98, further including means for dynamically relocating the server.

104. The apparatus of claim 103, wherein said means for dynamically relocating includes means for changing the server's port address.

105. The apparatus of claim 103, wherein said means for dynamically relocating includes means for changing the server's IP address.

106. The apparatus of claim 98, wherein said predicted sequence number is computed by the steps of:

maintaining a local variable representing said predicted sequence number on both the client and the server;

incrementing said local variable on the server by said increment value or a value determined by said increment value algorithm each time the server receives a message from the client; and incrementing said local variable on the client by said increment value or a value determined by said increment value algorithm each time the client receives a message from the server.

107. The apparatus of claim 98, further including means for terminating the session if the sequence number of a received message does not match said predicted sequence number.

108. The apparatus of claim 98, wherein said another of said session parameters agreed upon during said negotiation is an encryption method and another of said session parameters agreed upon during said negotiation is a key.

109. The apparatus of claim 98, wherein said means for communicating includes:

means for encrypting said messages using said encryption method and said key; and means for sending the messages through the network.

110. A program storage device readable by a machine, tangibly embodying a program of instructions executable by the machine to perform a method for network communication between a server and a client logged on to a network, the method including:

receiving a packet from an authentication server indicating that the client should have access to the server;

sending a message to the client to initiate session negotiation if the client should have access to the server;

negotiating a session between the server and the client if the client should have access to the server, said negotiating comprising agreeing upon a set of session parameters, one of said session parameters being a sequence number and another of said session parameters being an increment value or increment value algorithm;

communicating between the server and client during said session by transmitting messages between the server and client, wherein said communicating involves sending a request message from the server to the client and awaiting a response message, or receiving a request message from said client and sending a response message to said client, each message including said sequence number;

incrementing said sequence number by said increment value or a value determined by said increment value algorithm each time a message is transmitted;

checking whether said sequence number matches a predicted sequence number each time a message is received by the server; and ignoring a received message if the sequence number of said received message does not match said predicted sequence number.

* * * * *

UNITED STATES PATENT AND TRADEMARK OFFICE
CERTIFICATE OF CORRECTION

PATENT NO.    : 6,502,192 B1                                              Page 1 of 1
DATED         : December 31, 2002
INVENTOR(S)   : Dan Linh Nguyen It is certified that error appears in the above-identified patent and that said Letters Patent is hereby corrected as shown below:

Column 8,
Line 14, delete "in".
Line 41, before "begins" insert -- process --.

Column 9,
Line 63, after "information" insert -- on --.

Column 10,
Lines 44 and 45, delete "encryption method p or the key if it feels there is a security threat imminent." and insert -- encryption method or the key if it feels there is a security threat imminent. --.

Signed and Sealed this

Sixteenth Day of December, 2003

JAMES E. ROGAN
*Director of the United States Patent and Trademark Office*